United States Patent
Krieger et al.

(10) Patent No.: US 11,064,250 B2
(45) Date of Patent: Jul. 13, 2021

(54) PRESENCE AND AUTHENTICATION FOR MEDIA MEASUREMENT

(71) Applicant: Google LLC, Mountain View, CA (US)

(72) Inventors: Ken Krieger, Jackson, WY (US); Andrew Joseph Alexander Gildfind, London (GB); Nicholas Salvatore Arini, Southampton (GB); Simon Michael Rowe, London (GB); Raimundo Mirisola, Zug (CH)

(73) Assignee: Google LLC, Mountain View, CA (US)

( * ) Notice: Subject to any disclaimer, the term of this patent is extended or adjusted under 35 U.S.C. 154(b) by 141 days.

(21) Appl. No.: 14/933,937

(22) Filed: Nov. 5, 2015

(65) Prior Publication Data

US 2018/0316966 A1    Nov. 1, 2018

Related U.S. Application Data

(63) Continuation-in-part of application No. 13/843,559, filed on Mar. 15, 2013, now abandoned.

(51) Int. Cl.
*H04N 21/441* (2011.01)
*H04N 21/40* (2011.01)
(Continued)

(52) U.S. Cl.
CPC ......... *H04N 21/441* (2013.01); *H04N 21/252* (2013.01); *H04N 21/254* (2013.01);
(Continued)

(58) Field of Classification Search
CPC ....... H04N 21/25883; H04N 21/25891; H04N 21/44204; H04N 21/44213;
(Continued)

(56) References Cited

U.S. PATENT DOCUMENTS

| | | |
|---|---|---|
| 6,275,806 B1 | 8/2001 | Pertrushin |
| 6,421,453 B1 | 7/2002 | Kanevsky et al. |

(Continued)

FOREIGN PATENT DOCUMENTS

CN    105208014 A    12/2015

OTHER PUBLICATIONS

"Amazon and Google Want to Turn Their Smart Home Speakers Into Telephone Replacements—Mac Rumors" MacRumors, 9 pages.
(Continued)

*Primary Examiner* — Mulugeta Mengesha
*Assistant Examiner* — Alazar Tilahun
(74) *Attorney, Agent, or Firm* — Foley & Lardner LLP

(57) ABSTRACT

A method, executed by a processor, is used to determine presence of a viewer at a media device. The method includes receiving viewer biometric data captured by a biometric capture device associated with the media device; determining a category of the viewer based on the captured viewer biometric data; comparing the captured viewer biometric data to a reference to determine a possible identity of the viewer, by: determining a presence probability for the viewer based on a match between the biometric data and the reference, and determining a confidence level for the probability; and when the probability and confidence level equal or exceed a threshold, determining the viewer is present at the media device.

20 Claims, 13 Drawing Sheets

(51) Int. Cl.
| | |
|---|---|
| *H04N 21/442* | (2011.01) |
| *H04N 21/466* | (2011.01) |
| *H04N 21/25* | (2011.01) |
| *H04N 21/658* | (2011.01) |
| *H04N 21/254* | (2011.01) |
| *H04N 21/258* | (2011.01) |

(52) U.S. Cl.
CPC ..... *H04N 21/258* (2013.01); *H04N 21/44218* (2013.01); *H04N 21/44222* (2013.01); *H04N 21/4667* (2013.01); *H04N 21/6582* (2013.01)

(58) Field of Classification Search
CPC ....... H04N 21/44218; H04N 21/44222; H04N 21/6582; H04N 1/00381; H04N 21/44008; H04N 21/4223; H04N 21/25875; H04N 21/4532; H04N 21/4667; H04N 21/4524; H04N 21/441; H04N 21/252; H04N 21/258; H04N 21/254
See application file for complete search history.

(56) References Cited

U.S. PATENT DOCUMENTS

| | | | |
|---|---|---|---|
| 6,684,249 B1 | 1/2004 | Frerichs et al. | |
| 6,857,007 B1 | 2/2005 | Bloomfield | |
| 7,636,456 B2 | 12/2009 | Collins et al. | |
| 7,853,255 B2 | 12/2010 | Karaoguz et al. | |
| 8,027,518 B2 | 9/2011 | Baker et al. | |
| 8,091,100 B2* | 1/2012 | Donato | H04H 60/45 348/587 |
| 8,195,133 B2 | 6/2012 | Ramer et al. | |
| 8,386,386 B1 | 2/2013 | Zhu | |
| 8,504,691 B1 | 8/2013 | Tobler et al. | |
| 8,769,557 B1* | 7/2014 | Terrazas | H04N 21/44218 725/12 |
| 8,903,716 B2 | 12/2014 | Chen et al. | |
| 2002/0149705 A1 | 10/2002 | Allen et al. | |
| 2005/0185779 A1 | 8/2005 | Toms | |
| 2006/0041926 A1 | 2/2006 | Istvan et al. | |
| 2007/0097975 A1 | 5/2007 | Rakers et al. | |
| 2007/0127688 A1 | 6/2007 | Doulton | |
| 2008/0071537 A1 | 3/2008 | Tamir et al. | |
| 2009/0146779 A1* | 6/2009 | Kumar | G06K 9/00885 340/5.31 |
| 2009/0217324 A1* | 8/2009 | Massimi | H04H 20/106 725/46 |
| 2009/0262069 A1* | 10/2009 | Huntington | G06F 21/34 345/156 |
| 2010/0306394 A1* | 12/2010 | Brown | H04L 63/0492 709/229 |
| 2011/0208524 A1 | 8/2011 | Haughay | |
| 2011/0314530 A1 | 12/2011 | Donaldson | |
| 2012/0135684 A1 | 5/2012 | Shrum et al. | |
| 2012/0140069 A1 | 6/2012 | Ding et al. | |
| 2012/0245941 A1 | 9/2012 | Cheyer | |
| 2012/0262271 A1 | 10/2012 | Torgersrud et al. | |
| 2012/0265528 A1 | 10/2012 | Gruber et al. | |
| 2012/0281885 A1 | 11/2012 | Syrdal et al. | |
| 2013/0097682 A1 | 4/2013 | Zeljkovic et al. | |
| 2013/0117022 A1 | 5/2013 | Chen et al. | |
| 2013/0156273 A1 | 6/2013 | Nielsen | |
| 2013/0173765 A1* | 7/2013 | Korbecki | H04N 21/42209 709/221 |
| 2013/0275164 A1 | 10/2013 | Gruber et al. | |
| 2013/0304758 A1 | 11/2013 | Gruber et al. | |
| 2013/0311997 A1 | 11/2013 | Gruber et al. | |
| 2013/0329966 A1 | 12/2013 | Hildreth | |
| 2014/0150002 A1 | 5/2014 | Hough et al. | |
| 2014/0222436 A1 | 8/2014 | Binder et al. | |
| 2014/0249817 A1 | 9/2014 | Hart et al. | |
| 2015/0090781 A1 | 4/2015 | Yang | |
| 2015/0142438 A1 | 5/2015 | Dai et al. | |
| 2015/0371639 A1 | 12/2015 | Foerster et al. | |
| 2016/0093304 A1 | 3/2016 | Kim et al. | |
| 2016/0218884 A1 | 7/2016 | Ebrom et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |
| 2018/0033438 A1 | 2/2018 | Toma et al. | |
| 2018/0069963 A1 | 3/2018 | Chen et al. | |

OTHER PUBLICATIONS

"Apple Patent Reveals a New Security Feature Coming to Siri" 6 pages.

"Introducing Echo Look Hands-Free Camera and Style Assistant" 1996-2017, Amazon.com, Inc. 5 pages.

"The Patent Behind Google Home's New Feature of Understanding Different Voices in the Home Surfaced Today", Apr. 20, 2017, 5 pages.

Close, "Amazon Echo Will Give You These Deals If You Order Through Alexa This Weekend," Web Article, Nov. 18, 2016, Time. com (2 pages).

Collins, Terry "Can Twitter Save itself? The Social Network is Slowly gaining users, but still Lags Far Behind Rivals. Is a Turnaround Possible?" 3 pages.

Cook, "A Siri for advertising: These mobile ads talk back to you," Web Article, Apr. 1, 2013, Geekwire.com (7 pages).

Golgowski, Nina, "This Burger King Ad Is Trying to Control Your Google Home Device", Apr. 12, 2017, 7 pages.

Larson, Selena "Google Home Now Recognizes your Individual Voice" dated Apr. 20, 2017, 3 pages.

Nieva, Richard, "Google Home and eBay can tell you how much that's worth", 3 pages.

Purcher, Jack, Today Google Home's Virtual Assistant can learn its Owner's voice for Security Reasons like Apple's Patent Pending Idea, Apr. 20, 2017, 4 pages.

Seifert, Dan "Samsung's New Virtual Assistant Will Make Using Your Phone Easier", Mar. 20, 2017, 7 pages.

Sherr, Ian "IBM Built a Voice Assistant for Cybersecurity" dated Feb. 13, 2017, 4 pages.

Siegal, Daniel, "IP Attys Load Up Apps' Legal Challenges At Silicon Beach" 6 pages.

Simonite, "How Alexa, Siri, and Google Assistant Will Make Money Off You," Web Article, May 31, 2016, technologyreview. com (11 pages).

Simonite, "How Assistant Could End Up Eating Google's Lunch," Web Article, Sep. 23, 2016, technologyreview.com (9 pages).

"Walmart and Google to offer voice-enabled shopping", BBC News, Aug. 23, 2017.

Broussard, Mitchel, "Chatbot-Like Siri Patent Includes Intelligent Image, Video, and Audio Recognition within Messages", MacRumors, May 11, 2017 (7 pages).

Chen, Lulu Yilun, "Alibaba Challenges Google, Amazon With New Echo-Like Device", Bloomberg Technology, Jul. 5, 2017 (3 pages).

Crist, Ry, "Logitech Harmony's Alexa Skill just got a whole lot better", cnet, Jul. 13, 2017 (2 pages).

Forrest, Conner, "Essential Home wants to be bridge between Amazon's Alexis, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", cnet, May 20, 2017 (7 pages).

Gebhart, Andrew, "Google Home to the Amazon Echo: 'Anything you can do . . . '", cnet, May 18, 2017 (7 pages).

Gibbs, Samuel, "Your Facebook Messenger app is about to be filled with ads", The Guardian, Jul. 12, 2017 (3 pages).

Google Developers, "GoogleAssistant SDK" reprinted from https://developers.google.com/assistant/sdk/ on Aug. 22, 2017 (4 pages).

Gurma, et al., "Apple Is Manufacturing a Siri Speaker to Outdo Google and Amazon", Bloomberg, May 31, 2017 (5 pages).

(56) References Cited

OTHER PUBLICATIONS

Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (2 pages).
Lee, Dave, "The five big announcements from Google I/O", BBC News, May 18, 2017 (9 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Sablich, Justin, "Planning a Trip With the Help of Google Home", New York Times, May 31, 2017 (6 pages).
Smith, Dave, "The Amazon Echo got 2 incredibly useful features thanks to a new update", Business Insider, Jun. 1, 2017 (5 pages).
Willens, Max, "For publishers, Amazon Alexa holds promise but not much money (yet)", Digiday, Jul. 6, 2017 (6 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.

Unknown Author, "'Dolphin' attacks fool Amazon, Google voice assistants", BBC News, Sep. 7, 2017, 8 pages.
International Search Report and Written Opinion on PCT/US2017/049721 dated Dec. 1, 2017 (142 pages).
Office Action on U.S. Appl. No. 13/843,559 dated Jan. 12, 2015.
Office Action on U.S. Appl. No. 13/843,559 dated Jun. 16, 2014.
Sahota, Mantej Singh. Voice Recognition System Based on Audio Fingerprinting. Fall 2010. Available at http://csus-dspace.calstate.edu/bitstream/handle/10211.9/838/Report.pdf?sequence=1.
Buckland et al., "Amazon's Alexa Takes Open-Source Route to Beat Google Into Cars", Bloomberg, Feb. 27, 2018, 6 pages.
Office Action on U.S. Appl. No. 15/638,316 dated Jul. 3, 2018.
Office Action on U.S. Appl. No. 15/628,279 dated Jun. 25, 2018.
Corrected Notice of Allowance U.S. Appl. No. 16/725,371 dated Dec. 17, 2020 (2 pages).
Examination Report for IN Appln. Ser. No. 201747045088 dated Jun. 23, 2020 (5 pages).
Extended European Search Report for EP Appln. Ser. No. 19179005.4 dated Jul. 31, 2019 (9 pages).
Final Office Action for U.S. Appl. No. 15/628,279 dated Jan. 26, 2019 (21 pages).
Final Office Action for U.S. Appl. No. 15/638,316 dated Feb. 4, 2019 (31 pages).
Final Office Action for U.S. Appl. No. 15/862,963 dated Jul. 13, 2020 (22 pages).
First Action Interview Office Action Summary for U.S. Appl. No. 15/395,729 dated Dec. 12, 2018 (4 pages).
First Action Interview Pilot Program Pre-Interview Communication for U.S. Appl. No. 15/395,729 dated Aug. 9, 2018 (4 pages).
First Office Action for CN Appln. Ser. No. 201780001665.6 dated Jun. 17, 2020 (13 pages).
International Preliminary Report on Patentability for PCT Appln. Ser. No. PCT/US2017/049721 dated Aug. 13, 2018 (21 pages).
Non-Final Office Action for U.S. Appl. No. 15/628,279 dated Oct. 31, 2019 (28 pages).
Non-Final Office Action for U.S. Appl. No. 15/638,316 dated Aug. 22, 2019 (17 pages).
Non-Final Office Action for U.S. Appl. No. 15/862,963 dated Jan. 19, 2021 (31 pages).
Non-Final Office Action for U.S. Appl. No. 15/862,963 dated Jan. 3, 2020 (18 pages).
Non-Final Office Action for U.S. Appl. No. 15/863,042 dated Apr. 3, 2019 (17 pages).
Notice of Allowance for U.S. Appl. No. 15/395,729 dated May 21, 2019 (16 pages).
Notice of Allowance for U.S. Appl. No. 15/395,729 dated Sep. 13, 2019 (17 pages).
Notice of Allowance for U.S. Appl. No. 15/628,279 dated Apr. 29, 2020 (8 pages).
Notice of Allowance for U.S. Appl. No. 15/638,316 dated Mar. 12, 2020 (8 pages).
Notice of Allowance for U.S. Appl. No. 15/638,316 dated Dec. 16, 2019 (8 pages).
Notice Notice of Allowance for U.S. Appl. No. 15/863,042 dated Sep. 16, 2019 (18 pages).
Notice of Allowance for U.S. Appl. No. 16/725,371 dated Nov. 3, 2020 (10 pages).
Office Action for KR Appln. Ser. No. 10-2017-7031374 dated May 7, 2019 (19 pages).
Office Action for KR Appln. Ser. No. 10-2017-7031374 dated Oct. 17, 2019 (6 pages).
Office Action for KR Appln. Ser. No. 10-2020-7020741 dated Sep. 15, 2020 (6 pages).
Reason for Refusal for JP Appln. No. 2017-556917 dated Nov. 5, 2019 (4 pages).
Reasons for Refusal for JP Appln. No. 2017-556917 dated Feb. 8, 2019 (10 pages).
Reasons for Refusal for JP Appln. No. 2020-72218 dated May 31, 2021 (4 pages).

* cited by examiner

PRESENCE AND AUTHENTICATION FOR MEDIA MEASUREMENT

BACKGROUND

Voice and gesture control systems, mechanisms, and devices are in use to control access to various media devices. For example, television remote control devices may incorporate a voice activated feature that allows a viewer to turn the television, and change channels and volume. The voice activation feature also may be used to sign on to a service, purchase a pay-per-view movie, and complete other transactions that in the past required manual entry using buttons on the remote control. Use of voice control may enhance the viewer's television viewing experience by doing away with cumbersome on screen interfaces and eliminating the need to find a specific button in a sea of remote control buttons. In addition to voice recognition, some systems incorporate gesture control, whereby a small camera on a television, for example, captures viewer gestures to identify an action requested by the viewer, such as to turn the television volume down.

SUMMARY

A method, executed by a processor, is used to determine presence of a viewer at a media device. The method includes receiving viewer biometric data captured by a biometric capture device associated with the media device; determining a category of the viewer based on the captured viewer biometric data; comparing the captured viewer biometric data to a reference to determine a possible identity of the viewer, by: determining a presence probability for the viewer based on a match between the biometric data and the reference, and determining a confidence level for the probability; and when the probability and confidence level equal or exceed a threshold, determining the viewer is present at the media device.

DESCRIPTION OF THE DRAWINGS

The detailed description refers to the following Figures in which like numerals refer to like items, and in which:

FIGS. 3-8 are flowcharts illustrating example viewer presence and authentication processes as executed by the systems of FIGS. 2A and 2B.

DETAILED DESCRIPTION

Figure 1A:
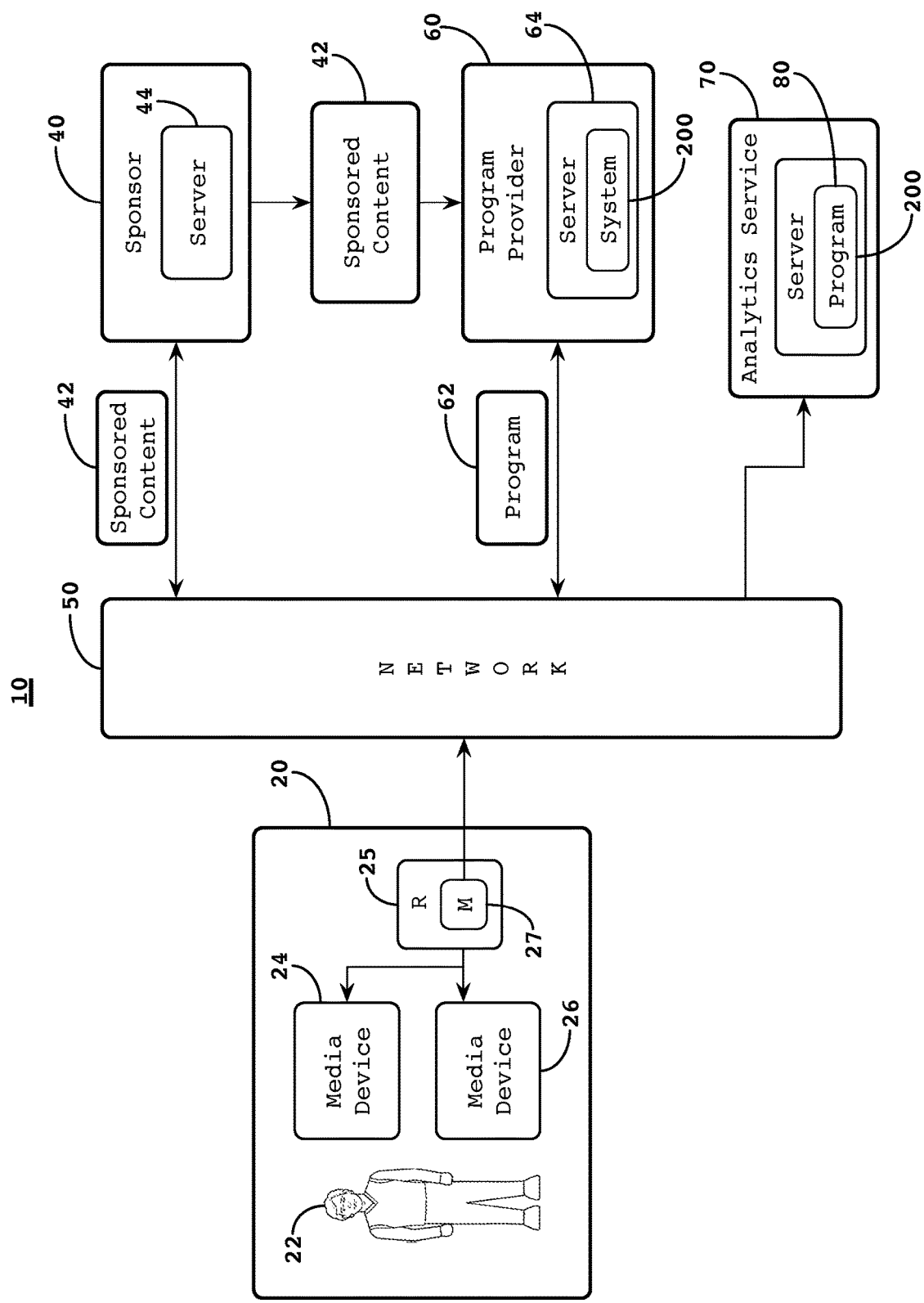
FIG. 1A-1C illustrate example environments in which viewer presence and authentication are enabled.

Media consumption is becoming increasingly personalized. This trend is rapidly moving from classic internet experience to all manner of devices in the home, including televisions. However, many televisions (and game consoles) are "shared" media devices. Adding personalization has the potential to greatly increase the value of a viewer's experience, but a barrier to making this seamless is the ability to authenticate the viewer. New television services, particularly Internet Protocol television (IPTV)-related services may allow the viewer to sign in to the service. Currently, such a sign-in may involve use of a cumbersome user interface or text entry system. Furthermore, there is no easy way for the viewer to log out for a short period.

A related problem exists in the media measurement space. For measurement purposes, it is important to know which viewer is watching television at any given time (known as "presence"). This problem may be solved by asking viewers to log in and out using a special remote control. However, this solution may present a significant cost to implement and may lead to compliance issues. Even if a truly "personalized" service were available, such a service might not be used with enough consistency for media metrics measurement.

Voice and gesture control systems, mechanisms, and devices are in use to control access to various media devices. For example, television remote control devices may incorporate a voice activated feature that allows a viewer to turn the television, and change channels and volume. The voice activation feature also may be used to sign on to a service (as noted above), purchase a pay-per-view movie, and complete other transactions that in the past required manual entry using buttons on the remote control. Use of voice control may enhance the viewer's television viewing experience by doing away with cumbersome on screen interfaces and eliminating the need to find a specific button in a sea of remote control buttons. In addition to voice recognition, some systems incorporate gesture control, whereby a small camera on a television, for example, captures viewer gestures to identify an action requested by the viewer, such as to turn the television volume down.

To overcome problems with presence determination as an element of an effective media measurement system, disclosed herein are presence and authentication systems and methods that, in an embodiment, use audio and video fingerprinting to detect and confirm the presence of a viewer at a media device, particularly a shared media device such as a television. The use of such audio or video biometric fingerprinting, either separately or in combination, presents a largely passive solution to the problems noted above.

Video fingerprinting, in particular, may operate to determine the presence of individual viewers among a group of viewers. Video fingerprinting may provide depth of field information, which helps to isolate a viewer from the background. Facial recognition, which may include a depth of field component, may be used as one aspect of video fingerprinting to determine the presence of a specific viewer. In addition, gesture analysis, which may provide for some kind of "pass-gesture" as well as basic physical attributes such as size and possibly gait analysis, may be used as part of the video fingerprinting process—for example, by pointing a camera at the room's doorway and measuring the height of viewers as they walk into or out of the room.

Some television platforms and some set top boxes (STBs) incorporate processors that are capable of passive viewer identity processes for presence and authentication purposes by capturing certain biometric information about the viewer, such a video or audio fingerprint of the viewer, as noted above. However, in addition to the processing capability, and any required identity programming, these media devices require some additional hardware, firmware, and/or software to capture the biometric information. Some televisions are being produced with small cameras capable of capturing such information. The cameras generally have a wide lens and are directed toward the intended viewing audience. Similarly, some television incorporate microphones that may be used for audio fingerprinting of viewers.

With respect to viewer identity, using a video camera connected to the media device, facial recognition software may be employed as a tool in detecting the number and identities of viewers in real time. A media device with a video camera (or still camera) may capture the facial images of viewers in a viewing location (e.g., in a room such as the viewers' living room) as the viewers come and go, and may use this information to personalize or improve the viewers' viewing experience and to better measure the viewers' viewing history.

Generally, facial recognition is a computer-based system for automatically identifying or verifying a person from a digital image or a video frame. Recognition algorithms include at least two main approaches. A geometric approach looks at distinguishing facial features, while a photometric approach is a statistical approach that distills an image into values and compares the values with templates to eliminate variances in order to find a match. The selected facial features may be, for example, the relative position, size, and/or shape of the eyes, nose, cheekbones, and jaw. These salient features then are compared with features of other images in a data set to locate matching features.

When using a computerized multimedia device such as a smart television, a viewer may choose to initially associate his face with his identity. For example, the viewer may sign on to a service such as a streaming video service and register an image of his face with the service. When the viewer subsequently access his account, the multimedia device may capture a current image of the viewer's face and use that image to verify the presence and authenticate the identity of the viewer. One advantage of this approach is that it is passive—that is, this approach does not require any subsequent log-in/log-out actions by the viewer. This passive approach to determining viewer presence may enhance the viewer's viewing experience. Alternatively, the viewer may associate an image of his face with his identity when initially setting up the media device—that is, the facial image is stored in a database on the multimedia device.

Even if a viewer chooses not to identify himself as above, knowing a "logical identity" (i.e., the facial recognition software recognizes the same viewer as these other times) or a general category (e.g., a male as distinguished from a female when a viewing location is known normally to be populated only by males, may help identify the viewer, as described below.

Accurate measurement of media consumption metrics may hinge on more than just viewing history. In particular, media consumption measurement may be improved by accurate determination of viewer presence when multiple viewers are present, and when multiple types of media devices are in use. For example, although one viewer in a household may watch a particular sporting event on a home media device (e.g. a television), commercials related to the sporting event may be of limited interest to other viewers in the household. This is where the use of identity along with viewing history becomes valuable. Viewing history may be recorded with respect to the identities of the viewers present in the room during different shows. Each viewer may have a different history.

In summary, gathering a viewing history for each viewer based on a passive, auto-recognized identity, inferring demographic or viewer's interests information based on past shows that each individual has watched, possibly combined with other program provider account information (e.g., search history or profile and other information available at a social networking website) provides a great amount of highly relevant information in selecting better ad choices. Some media devices can dynamically display the ads that are relevant to the viewers that are present based on this information.

In embodiments disclosed herein, viewers may explicitly identify themselves each time they sit in front of the television, rather than automatically being detected by a video camera. This type of identification is essentially "logging in" to watch television. Explicit incentives for this process may be provided such as special deals on advertised products for watching a particular show, or restricting access to certain shows.

In other embodiments disclosed herein, viewer presence may begin by picking up the viewers' faces with a camera (e.g., a wide-angled front-facing camera) embedded in or mounted on the television or some component of the television, and using facial recognition, matching the viewers' faces with faces associated in some way to online social networking profiles.

Figure 1B:
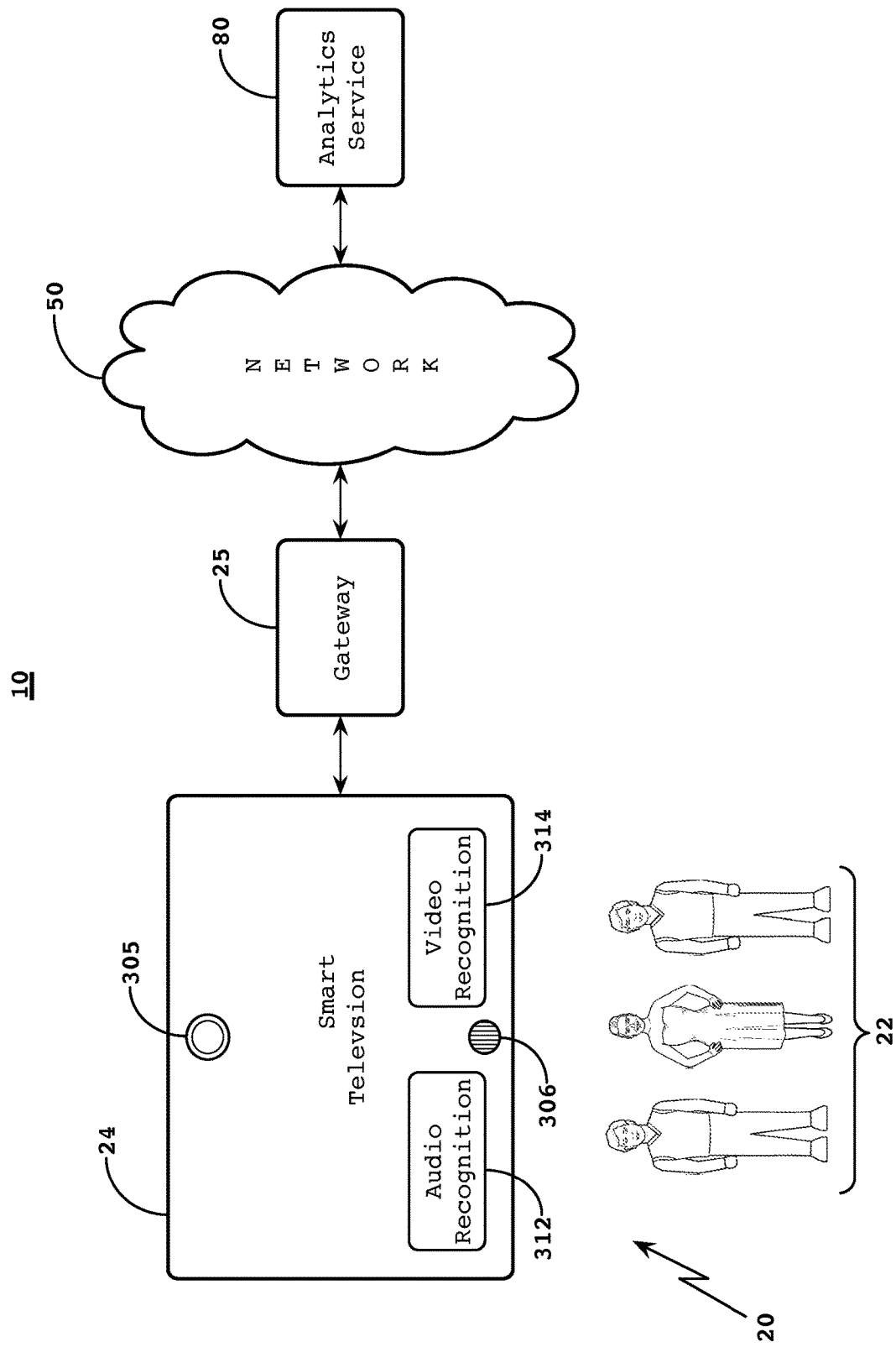
Figure 1C:
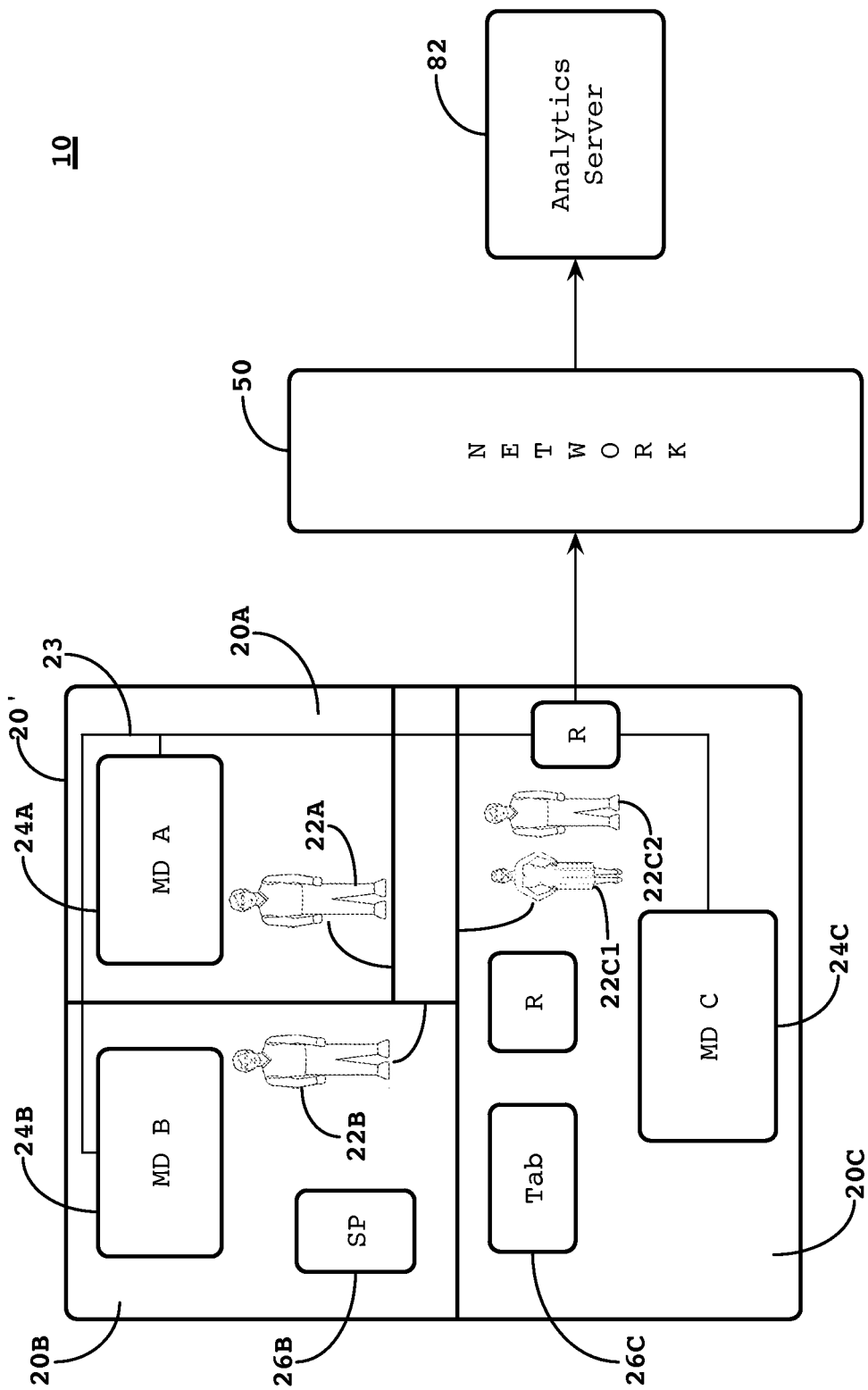

FIGS. 1A-1C illustrate example environments in which viewer presence may be determined and viewer identity verified (authentication) using passive presence and passive and active authentication mechanisms.

FIG. 1A illustrates an example environment in which personal analytics and usage controls may be implemented. In FIG. 1A, environment 10 includes viewing locations 20, sponsor 40, and program provider 60, all of which communicate using communications network 50. Although FIG. 1A shows these entities as separate and apart, at least some of the entities may be combined or related. For example, the sponsor 40 and program provider 60 may be part of a single entity. Other combinations of entities are possible.

The viewing location 20 includes first media device 24 and second media device 26 through which viewers 22 are exposed to media from sponsor 40 and program provider 60. A viewing location 20 may be the residence of the viewer 22, who operates media devices 24 and 26 to access, through router 25, resources such as Web sites and to receive television programs, radio programs, and other media. The media devices 24 and 26 may be fixed or mobile. For example, media device 24 may be an Internet connected "smart" television (ITV); a "basic" or "smart" television connected to a set top box (STB) or other Internet-enabled device; for example. In an embodiment, the media device 24 includes biometric information capture devices and systems, which are described in detail with respect to fire 1B and FIGS. 2A and 2B. Media device 26 may be a tablet, a smart phone, a laptop computer, or a desk top computer, for example. The media devices 24 and 26 may include browsers. A browser may be a software application for retrieving, presenting, and traversing resources such as at the Web sites. The browser may record certain data related to the Web site visits. The media devices 24 and 26 also may include applications. A viewer 22 may cause the media devices 24 or 26 to execute an application, such as a mobile banking application, to access online banking services. The applications may involve use of a browser or other means, including cellular means, to connect to the online banking services.

The viewing location 20 may include a monitor 27 that records and reports data collected during exposure of sponsored content segments 42 and programs 62 to the viewer 22. The example monitor 27 may be incorporated into router 25 through which certain media (e.g., Internet-based content) received at the viewing location 20 passes.

The sponsor 40 operates server 44 to provide sponsored content segments that are served with programs 62 provided by the program provider 60. For example, the server 44 may provide sponsored content segments to serve with broadcast television programming. The sponsored content segments 42 may include audio, video, and animation features. The sponsored content segments 42 may be in a rich media format. The sponsor 40 may provide a promotional campaign that includes sponsored content segments to be served across different media types or a single media type. The cross-media sponsored content segments 42 may be complementary; that is, related to the same product or service.

The network 50 may be any communications network that allows the transmission of signals, media, messages, voice, and data among the entities shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be all or a portion of an enterprise or secured network. In an example, the network 50 may be a virtual private network (VPN) between the program provider 60 and the media devices 24 and 26. While illustrated as a single or continuous network, the network 50 may be divided logically into various sub-nets or virtual networks, so long as at least a portion of the network 50 may facilitate communications among the entities of FIG. 1A.

The program provider 60 delivers programs for consumption by the viewer 22. The programs 62 may be broadcast television programs. Alternately, the programs 62 may be radio programs, Internet Web sites, or any other media. The programs 62 include provisions for serving and displaying sponsored content segments 42. The program provider 60 may receive the sponsored content segments 42 from the sponsor and incorporate the sponsored content segments into the programs 62. Alternately, the viewer's media devices may request a sponsored content segment 42 when those media devices display a program 62.

The program provider 60 operates server 66 to serve programs and to implement usage control system 200. The system 200 may collect information related to programs 62 displayed at the media devices 24 and 26. The system 200 may provide an interface that allows the viewer 22 to establish usage controls.

FIG. 1B illustrates aspects of the environment 10 of FIG. 1A, emphasizing viewer presence and authentication features. In FIG. 1B, media device 24 (an Internet-connect smart television) at viewing location 20 is shown to include camera 305, microphone 306, and audio recognition system 312 and video recognition system 314. Some of these components of the television 24 may form at last a part of a presence and authentication system 300 (see FIG. 3) whereby viewers at the viewing location 20 may have their presence detected and their identities authenticated. The television 24 receives programming and advertisements through gateway 25, and provides measurement data to analytics service 70 through the gateway 25. In an embodiment, the gateway is a router (e.g., router 25 of FIG. 1A). In an aspect, the router 25 may be configured to log certain information related to programs viewed on and advertisements served at the television 24. The router 25 may pass this information to the analytics service 70. The router 25 also may pass viewer presence and authentication information to the analytics service 70.

Three viewers 22 are shown at the viewing location 20, each viewing programming on the television 24. The feature extraction and analysis system may obtain certain biometric information about the viewers 22, such as video and audio fingerprint information and use the information to determine, within some confidence level, how many viewers 22 are in front of the television 24, what the identities of the viewers 22 are, which viewer is interacting with the television 24 (e.g., changing channels with a remote control) and other information. Note that any image/audio processing occurs locally, only. Certain aspects of the processed information, but not any viewer images or audio, and no information that may be used to identify a viewer, then may be supplied to the analytics service 70.

FIG. 1C illustrates additional aspects of the environment 10 of FIG. 1A. In FIG. 1C, viewing location 20' is shown as a residence of four viewers 22A-22C2. The viewing location 20' includes three separated viewing locations (or rooms) 20A-20C. Each such viewing location has installed therein a fixed media device, or Internet-enabled smart television 24i. In addition to the televisions 24i, the viewing location 20' also includes, in location 20B, smartphone 26B and in viewing location 20C, tablet 26C. All these media devices may be connected, by wired or wireless mechanisms (e.g., signal path 23), to router 25, which in turn is connected to analytics server 82 over network 50.

The televisions 24i each may include components to determine presence and authenticity of the viewers (i.e., the same television components as shown in FIG. 1B). As is clear from FIG. 1C, a viewer in location 20B (i.e., viewer 22B) cannot be viewing the television 24C. Therefore, if the presence and authentication components of television 24C were to indicate the presence of the viewer 22B in the location 20C, that presence indication would be erroneous.

In operation, the televisions 24i of FIG. 1C may detect when a viewer 22 enters or leaves a room, may determine a number of viewers in a room, and may determine which of multiple viewers 22 in a room is operating a task such as issuing orders to the television 24i. Note that the viewers need not be signed-in to the televisions 24i, or to any other media device. The presence and authentication system may operate in a completely passive mode. Alternately, the system may include active features, including active authentication features such as sign-in and password entry. An example of a presence and authentication system, as instantiated locally at the viewing location 20', is described in more detail with respect to FIG. 3.

In executing the processes of FIGS. 1A-1C, and as otherwise disclosed herein, individual viewer and household demographic data, Internet activity, and television viewing data, for example, may be collected and used. In situations in which the systems disclosed herein may collect and/or use personal information about viewers, or may make use of personal information, the viewers may be provided with an opportunity to control whether programs or features collect viewer information (e.g., information about a viewer's social network, social actions or activities, profession, a viewer's preferences, or a viewer's current location), or to control whether and/or how to receive media, including advertisements, from an server that may be more relevant or of interest to the viewer. Furthermore, where the control process involves detection of personal features, such as facial features capture through facial recognition) the viewers consent to capture and analysis of the features. In addition, certain data may be treated in one or more ways before it is stored or used, so that personally identifiable information is removed. For example, a viewer's identity may be treated so that no personally identifiable information can be determined for the viewer, or a viewer's geographic location may be generalized where location information is obtained (such as to a city, ZIP code, or state level), so that a particular location of a viewer cannot be determined. Thus, the viewer may have control over how information is collected about the viewer and used by a server.

Figure 2A:
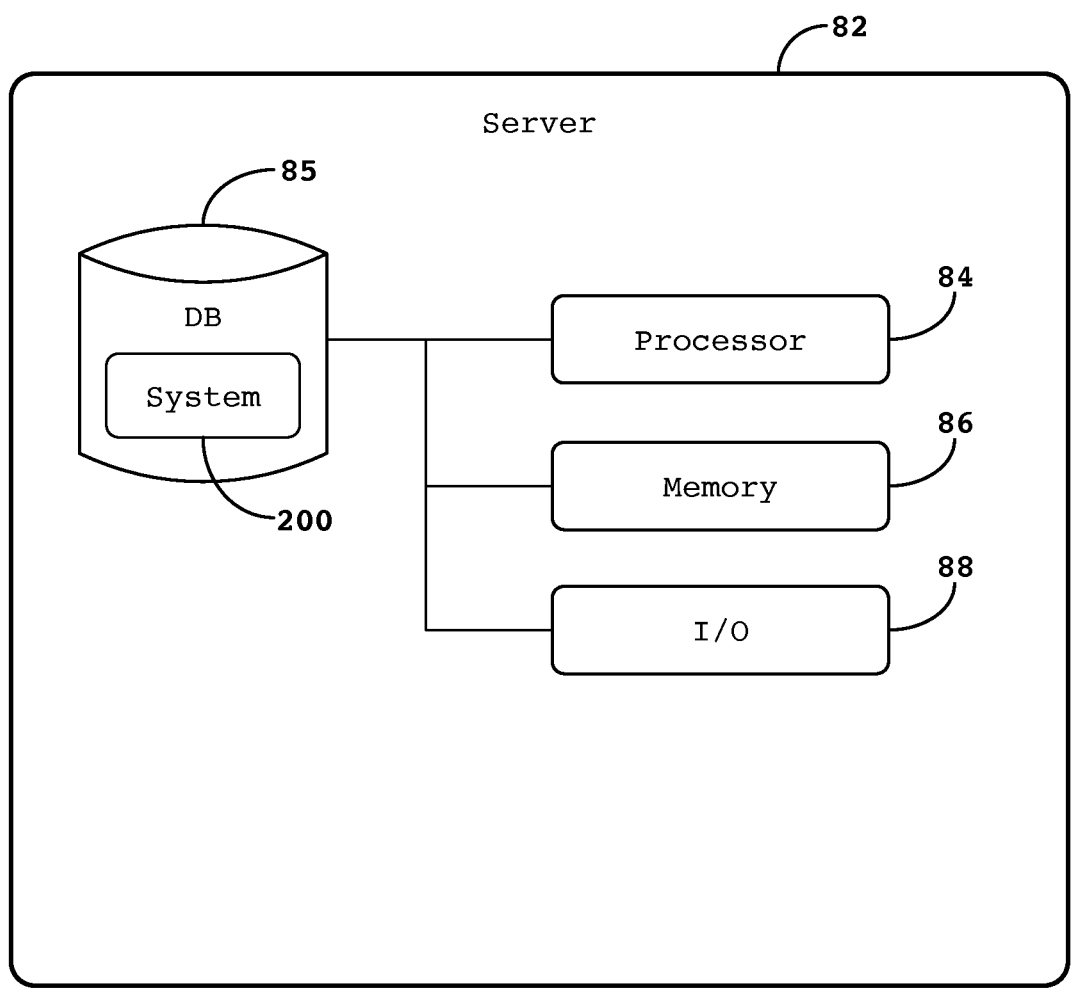
FIGS. 2A and 2B illustrates an example server-side measurement system that determines or uses presence and authentication information.

FIG. 2A illustrates an example measurement system instantiated on analytics server 82. The system includes processor 84, memory 86, input/output 88, and database 85. The database 85 may be a non-transitory computer-readable storage medium having encoded thereon measurement system 200. The processor 84 loads the machine instructions into memory 86 and executes the machine instructions to provide personal analytics and usage controls functions. The I/O 88 allows the server 70 to communicate with other entities such as the server 44.

The system 200 may, in an embodiment, perform feature extraction and analysis processes to determine the presence and authenticity of viewers at a viewing location such as the location 20' of FIG. 1C.

Figure 2B:
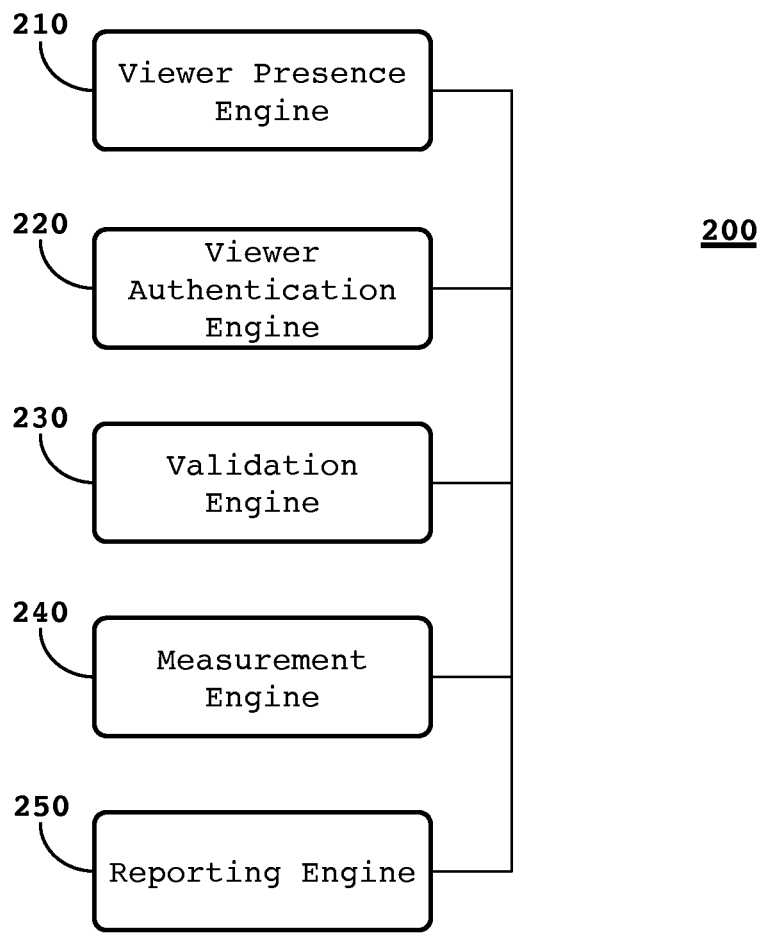

FIG. 2B illustrates example components of a media measurement system 200, implemented on the analytics server 82 of FIG. 2A. In FIG. 2B, system 200 includes viewer presence engine 210, viewer authentication engine 220, validation engine 230, measurement engine 240, and reporting engine 250.

The viewer presence engine 210 and the viewer authentication engine 220 may receive summary information from.

The validation engine 230 may, based on the presence and authentication information generated locally, determine that the confidence level of the information is sufficient to use in measurement analysis. For example, if the confidence level is 90 percent or higher, the validation engine 230 may allow use of the data in performing media measurements.

The measurement engine 240 determines various media consumption metrics such as reach, incremental reach, TRP, and other media consumption metrics. The repotting engine 250 may repots the media consumption metrics to interested parties such as the sponsor 40 and program provider of FIG. 1C.

Figure 3:
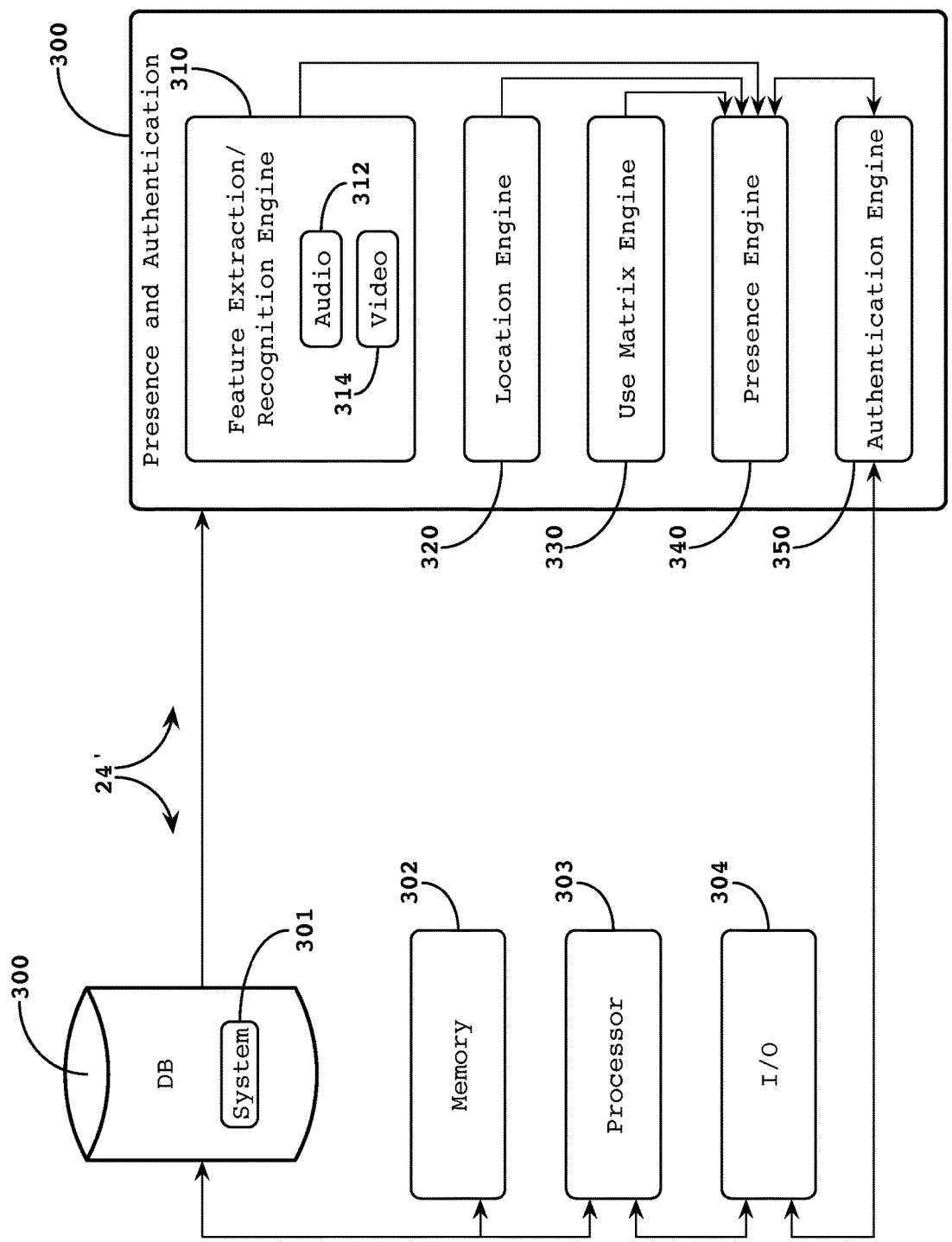
FIG. 3 illustrates and example client-side system that determines the presence and authentication of a viewer.
Figure 4:
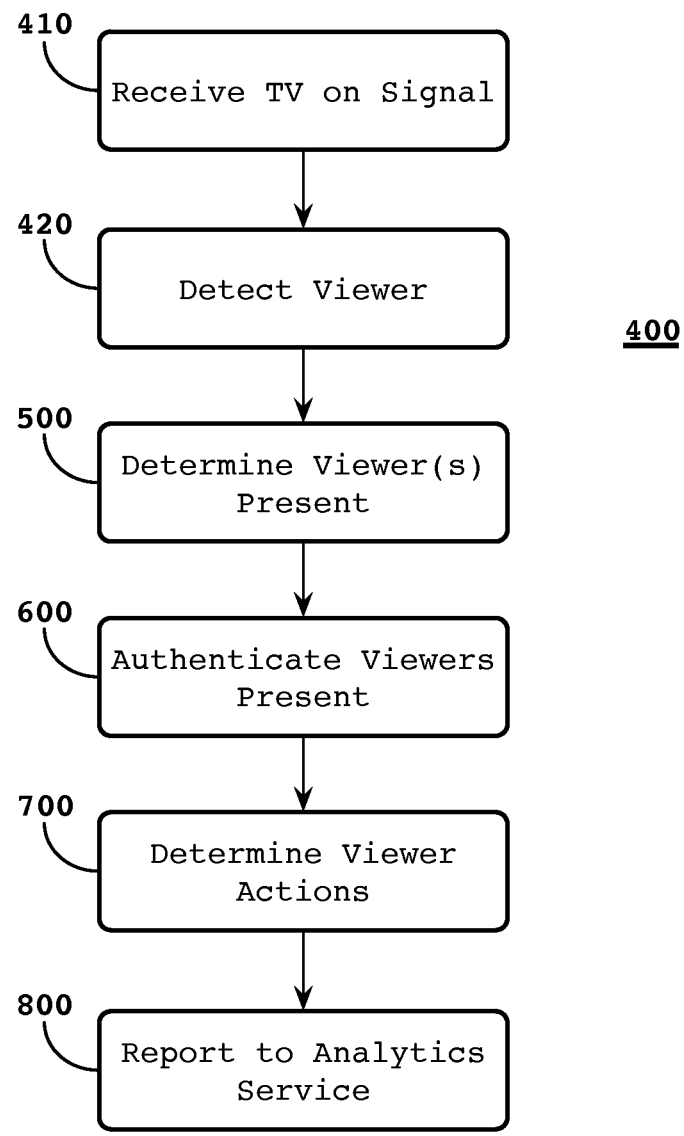
Figure 5A:
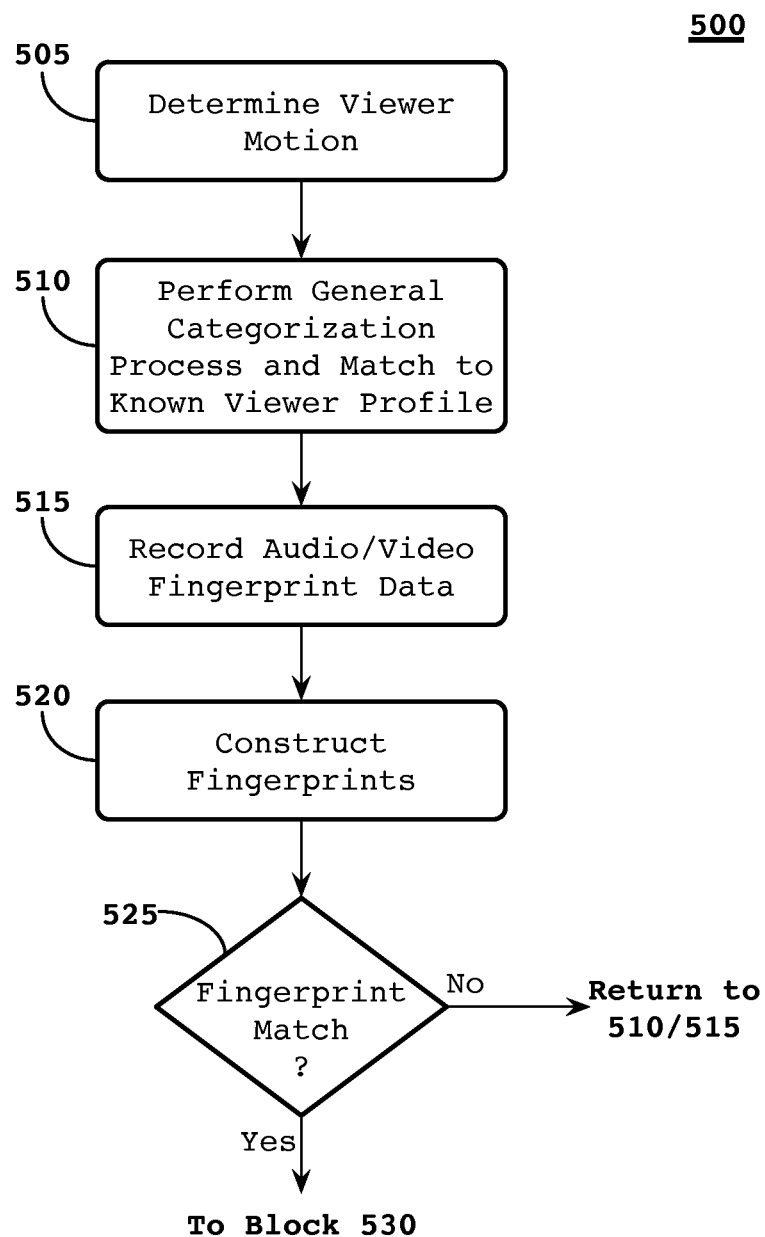
Figure 5B:
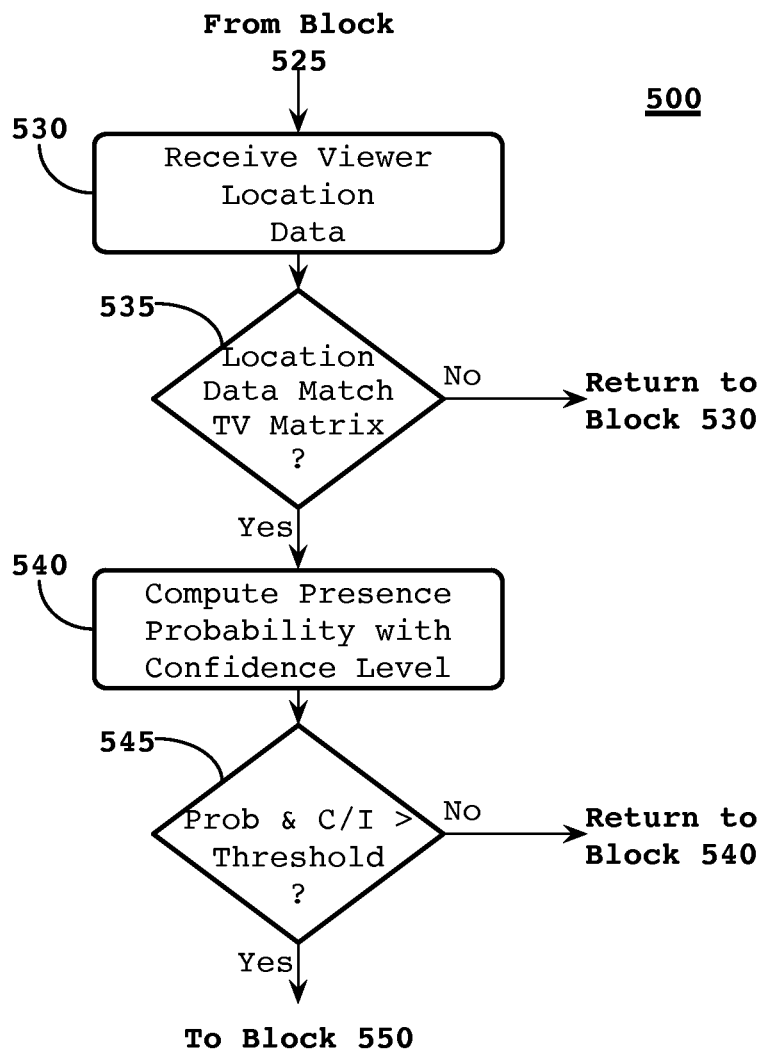
Figure 5C:
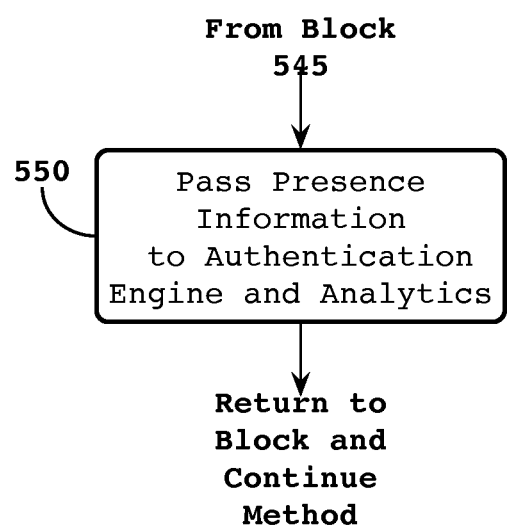
Figure 6:
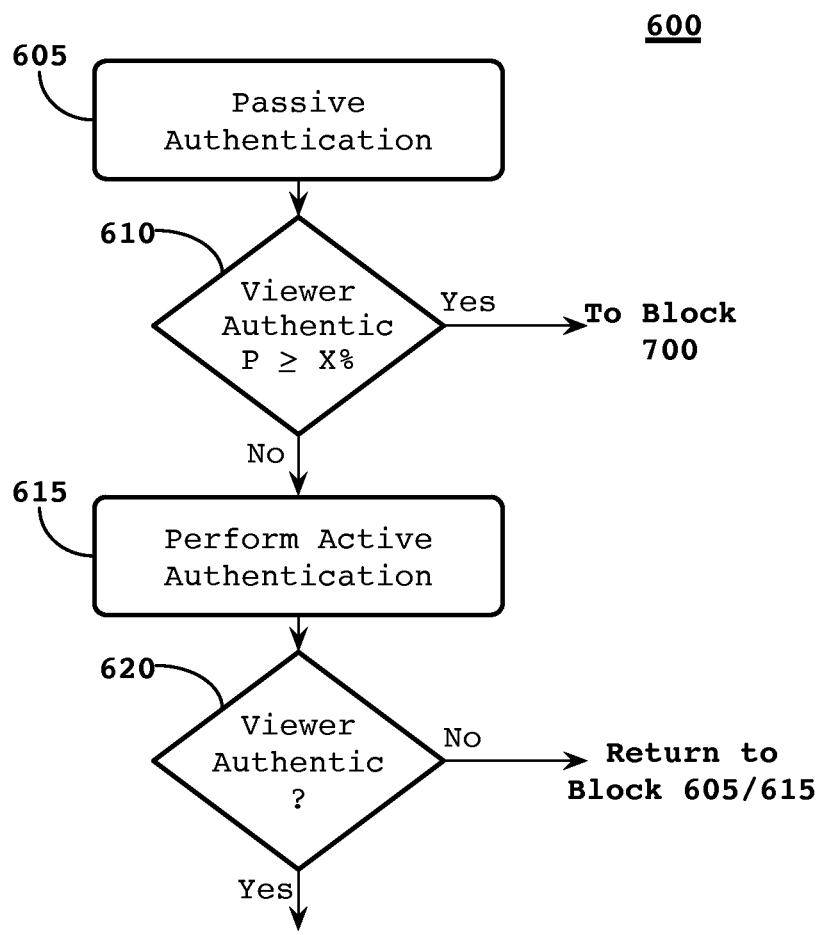

FIG. 3 illustrates an example of television components 24', including presence and authentication system 300 that may be installed or implemented on a television 24. The components 24' include database 301, memory 302, processor 303, and I/O 304.

The database 301 includes a non-transitory computer-readable storage medium on which is encoded system 300. The system 300 may be loaded into memory 302 and executed by processor 303. I/O may be used for man-machine communications between a viewer 22 and the processor 303. The processor 303 also receives inputs (raw or processed data) from the camera 305 and the microphone 306.

The presence and authentication system 300 includes feature extraction/recognition engine 310, location engine 320, use matrix engine 330, presence engine 340, and authentication engine 350.

The engine 310 includes audio module 312 and video module 314. The audio module 312 receives raw or processed audio data captured by the microphone 306 and produces a voice fingerprint, which is provided to the presence engine 340. The video module 314 receives raw or processed video data captured by the camera 305 and produces a video fingerprint, which is provided to the presence engine 340.

The location engine 320 may receive location information related to one or more of the viewers 22i (see FIG. 1C). For example, viewer 22C1 may be determined to be operating tablet 26C, either because the viewer 22C1 has logged on to a tablet service, or because a camera in the television 24C has detected a viewer operating a tablet. Other mechanisms for locating the tablet 26c may be used. The tablet 26C may be geo-located by, for example, a GPS system, which may locate the tablet 26c to the specific viewing location (room) 20C, or at least to the larger, overall viewing location 20'. Any location information for a viewer may be passed to the presence engine 340.

The use matrix engine 330 constructs a three-dimensional use matrix considering an initial condition of media devices and viewers at the viewing location 20'. That is, the matrix would show the location of each media device in each room, and the location of each viewer in each room. The engine 330 may update the matrix as the number and identity of media devices in the viewing location 20' changes, and as viewers come and go (both on a semi-permanent basis). The engine 330 then may populate the latest iteration of the matrix to reflect real time positioning of media devices and viewers as best determined by the engines 310 and 320. For example, the engine 330 may populate the matrix with values corresponding to the arrangement of media devices and viewers shown in FIG. 1C. the engine 330 then makes the populated matrix available to the presence engine 340.

The presence engine 340 determines a probability that a particular viewer and a particular media device are in a specific vroom based on its received inputs. For example, the probability that television 24C is in room 20C is 100 percent, but the probability that the viewer 22C1 is in room 20C may be ⅓ or greater (assuming the viewer 22C1 is in the viewing location 20' at all). The probability that the viewer 22C1 is in room 20C may be increase based on audio and video fingerprint information received from the engine 310 and location information received from the engine 320.

The presence engine 340 may, when multiple viewers are present, not be able to distinguish between the multiple viewers. In that case, the engine 340 may report the presence of multiple viewers. However, if, for example, viewer 22B was known with a 90 percent confidence level, to be in room 20B, the engine 340 could use this information to better indicate the composition of the viewers in room 20C (i.e., possibly viewers 22A, 22C1, 22C2; not viewer 22B).

The presence engine 340 may provide the presence information to the analytics server 82 and to the authentication engine 350.

The authentication engine 350 may provide for passive and active authentication processes. For example, the engine 350, knowing that viewer 22A is short, might receive from the presence engine 340 a video fingerprint conforming to the shape and size of a short person. In addition, the engine 350 may receive a voice fingerprint conforming to the specific voice patterns of the viewer 22A. By this and other cross-validation processes, the engine 350 may passively authenticate the identity of viewers 22 at the viewing location 20'.

The authentication engine 350 also may provide active authentication functions, such as requesting and/or receiving a viewer sign on by viewer identification and password entry, for example.

Certain of the devices shown in the herein described figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

Figure 7:
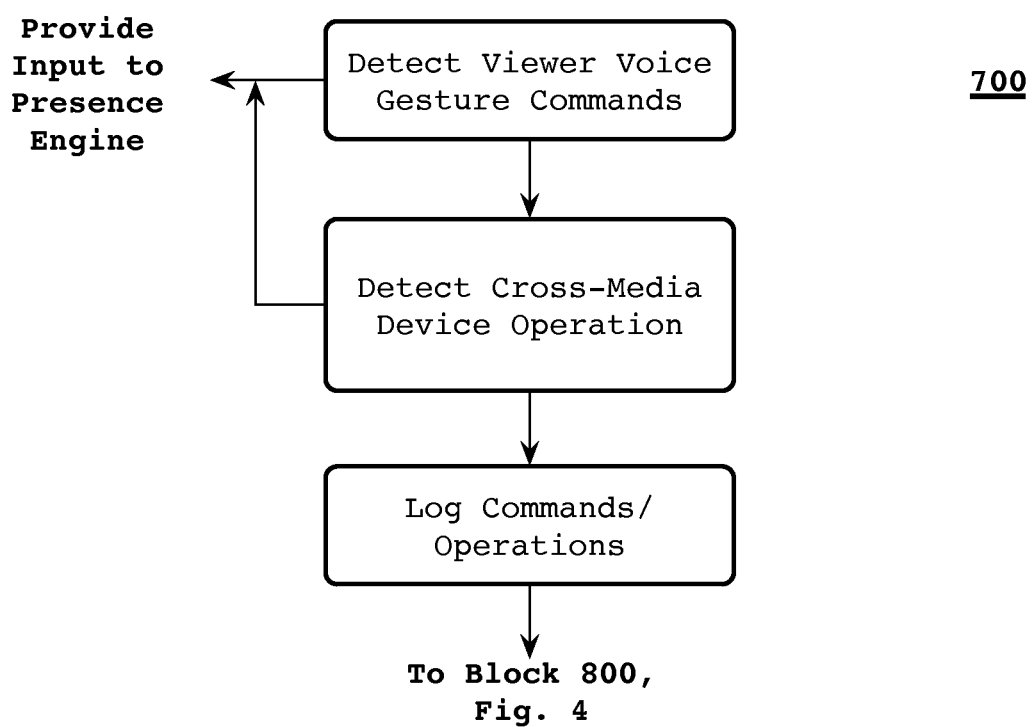
Figure 8:
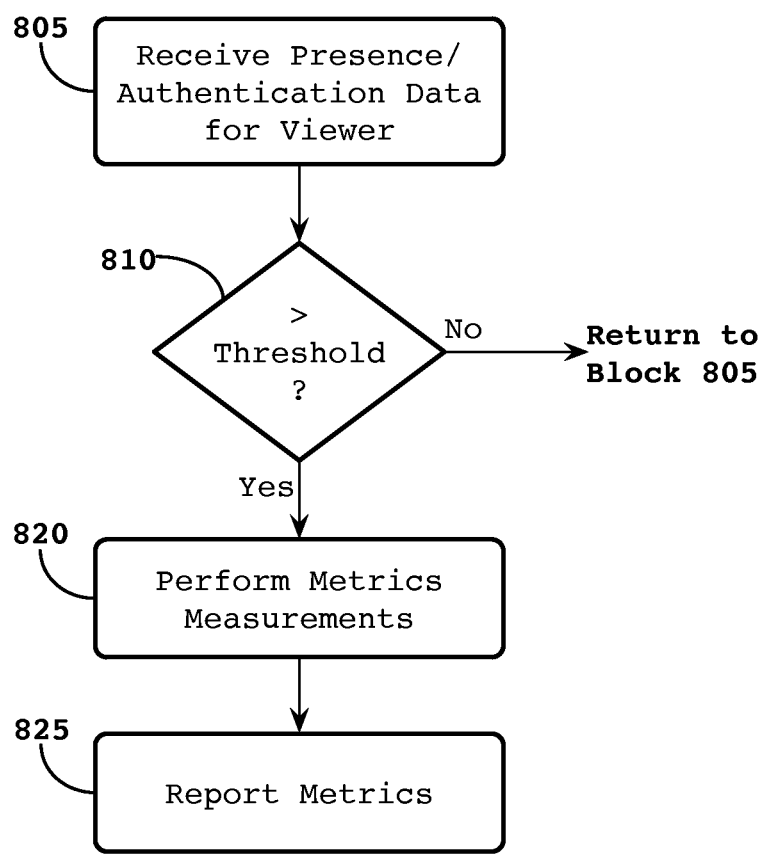

The preceding disclosure refers to flowcharts and accompanying descriptions to illustrate the embodiments represented in FIGS. 7 and 8. The disclosed devices, components, and systems contemplate using or implementing any suitable technique for performing the steps illustrated. Thus, FIGS. 7 and 8 are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A method for determining viewer presence at a media device, comprising:

receiving, by a location engine executed by a processor of a measurement device from a first device, a first identification of a presence of a viewer at a first location of a building including the first device;

receiving, by the location engine from a second device, a second identification of a presence of the viewer at a second location of the building including the second device, the second location different from and proximate to the first location;

determining, by a presence engine executed by the processor, a first probability of the first identification and a second probability of the second identification, the first probability indicating a first likelihood that the viewer is present at the first location, the second probability indicating a second likelihood that the viewer is present at the second location;

determining, by the presence engine, based on the first probability of the first identification exceeding the second probability of the second identification, that the viewer is viewing media on the first device at the first location and not the second device at the second location;

automatically authenticating, by an authentication engine executed by the processor, without active entry of authentication credential input by the viewer on either the first device or the second device, the viewer to the first device at the first location and not the second device at the second location responsive to determining that the viewer is viewing media on the first device at the first location; and recording, by a measurement engine executed by the processor, a consumption metric for the viewer of media displayed on the first device responsive to automatically authenticating the viewer to the first device.

2. The method of claim 1, further comprising reducing the second probability of the second identification, responsive to the first probability of the first identification exceeding the second probability of the second identification.

3. The method of claim 1, further comprising reducing the second probability of the second identification, responsive to a negative historical association between the second location and the viewer.

4. The method of claim 1, wherein the second identification of a presence of the viewer at the second location further comprises an identification of a presence of a plurality of viewers including the viewer at the second location; and wherein determining that the viewer is viewing media on the first device rather than the second device further comprises reducing the second probability of the second identification, responsive to the first probability of the first identification exceeding the second probability of the second identification.

5. The method of claim 4, wherein the measurement device is not able to distinguish individuals of the plurality of viewers at the second location.

6. The method of claim 1, further comprising generating a three-dimensional matrix of viewers, locations, and media devices, by a use matrix engine executed by the processor, indicating the presence of the viewer and first device in the first location, responsive to the determination.

7. The method of claim 6, further comprising subsequently identifying that the first device is in a third location; and updating the matrix to indicate the presence of the viewer and first device in the third location, responsive to the identification.

8. The method of claim 6, wherein the matrix further indicates the probability of the first device being in the first location, and the probability of the second device being in the second location.

9. The method of claim 1, wherein authenticating the viewer to the first device at the first location further comprises automatically logging the viewer into a service provided on the first device at the first location based on determining that the viewer is viewing media on the first device at the first location.

10. The method of claim 1, wherein determining that the viewer is viewing media on the first device at the first location further comprises determining that the viewer is viewing media on the first device at the first location subsequent to viewing the media on the second device at the second location; and
wherein authenticating the viewer to the first device further comprises switching authentication of the viewer from the second device at the second location to the first device at the first location, responsive to determining that the viewer is viewing media on the first device at the first location subsequent to viewing the media on the second device at the second location.

11. A system for determining viewer presence at a media device, comprising:
a measurement device comprising a processor executing a location engine, a presence engine, an authentication engine, and a measurement engine;
wherein the location engine is configured to:
receive, from a first device, a first identification of a presence of a viewer at a first location of a building including the first device, and
receive, from a second device, a second identification of a presence of the viewer at a second location of the building including the second device, the second location different from and proximate to the first location;
wherein the presence engine is configured to:
determine a first probability of the first identification and a second probability of the second identification, the first probability indicating a first likelihood that the viewer is present at the first location, the second probability indicating a second likelihood that the viewer is present at the second location;
determine that the viewer is viewing media on the first device at the first location and not the second device at the second location, based on the first probability of the first identification exceeding second probability of the second identification; and wherein the authentication engine is configured to automatically authenticate, without active entry of authentication credential input by the viewer on either the first device or the second device, the viewer to the first device at the first location and not the second device at the second location responsive to determining that the viewer is viewing media on the first device at the first location;
wherein the measurement engine is configured to record a consumption metric for the viewer of media displayed on the first device responsive to authenticating the viewer to the first device.

12. The system of claim 11, wherein the presence engine is further configured to reduce the second probability of the second identification, responsive to the first probability of the first identification exceeding the second probability of the second identification.

13. The system of claim 11, wherein the presence engine is further configured to reduce the second probability of the second identification, responsive to a negative historical association between the second location and the viewer.

14. The system of claim 11, wherein the second identification of a presence of the viewer at the second location further comprises an identification of a presence of a plurality of viewers including the viewer at the second location; and
wherein the presence engine is further configured to reduce the second probability of the second identification, responsive to the first probability of the first identification exceeding the second probability of the second identification.

15. The system of claim 14, wherein the measurement device is not able to distinguish individuals of the plurality of viewers at the second location.

16. The system of claim 11, wherein the measurement device further comprises a use matrix engine configured to generate a three-dimensional matrix of viewers, locations, and media devices, indicating the presence of the viewer and first device in the first location, responsive to the determination.

17. The system of claim 16, wherein the matrix further indicates the probability of the first device being in the first location, and the probability of the second device being in the second location.

18. The system of claim 11, wherein the authentication engine is further configured to automatically login the viewer into a service provided on the first device at the first location based on determining that the viewer is viewing media on the first device at the first location.

19. A non-transitory computer-readable storage medium storing instructions that, when executed by one or more data processors, cause the one or more data processors to perform operations comprising:
receiving, from a first device, a first identification of a presence of a viewer at a first location of a building including the first device;
receiving, from a second device, a second identification of a presence of the viewer at a second location of the building including the second device, the second location different from and proximate to the first location;
determining a first probability of the first identification and a second probability of the second identification, the first probability indicating a first likelihood that the viewer is present at the first location, the second probability indicating a second likelihood that the viewer is present at the second location;

determining, based on the first probability of the first identification exceeding the second probability of the second identification, that the viewer is viewing media on the first device at the first location and not the second device at the second location;

automatically authenticating, without active entry of authentication credential input by the viewer on either the first device or the second device, the viewer to the first device at the first location and not the second device at the second location responsive to determining that the viewer is viewing media on the first device at the first location; and recording a consumption metric for the viewer of media displayed on the first device responsive to authenticating the viewer to the first device.

20. The non-transitory computer-readable storage medium of claim 19, wherein the operations further comprise automatically logging the viewer into a service provided on the first device at the first location based on determining that the viewer is viewing media on the first device at the first location.

* * * * *